(12) United States Patent
Pienaar et al.

(10) Patent No.: US 6,196,776 B1
(45) Date of Patent: Mar. 6, 2001

(54) MULTIPLE AUTOMOBILE TRANSPORT SYSTEM

(76) Inventors: Salmon Pienaar, 38 Vigne Road, Summerstrad, Port Elizabeth 6001 (ZA); Richard Dawson Cox, 9240 Sunset Dr., Miami, FL (US) 33171; Mark Lacy, 3321 Lake Heights Ct., Dacula, GA (US) 30019

( * ) Notice: Subject to any disclaimer, the term of this patent is extended or adjusted under 35 U.S.C. 154(b) by 0 days.

(21) Appl. No.: 09/392,266

(22) Filed: Sep. 9, 1999

(51) Int. Cl.$^7$ ............................................. B60P 3/08
(52) U.S. Cl. ................................... 410/26; 410/24
(58) Field of Search .................................. 410/4, 24, 26; 414/498; 220/1.5; 211/85.8

(56) References Cited

U.S. PATENT DOCUMENTS

| 2,695,810 | 11/1954 | Demos . |
|---|---|---|
| 3,675,795 | 7/1972 | Dluhy . |
| 4,310,271 | 1/1982 | Canellis et al. . |
| 4,911,590 | * 3/1990 | Green . |
| 4,917,557 | 4/1990 | Kato et al. . |
| 5,127,781 | 7/1992 | Roarty et al. . |
| 5,213,458 | 5/1993 | Preller et al. . |
| 5,445,278 | 8/1995 | Gearin et al. . |
| 5,547,333 | * 8/1996 | Pienaar . |
| 5,567,111 | 10/1996 | Gearin et al. . |
| 5,769,591 | * 6/1998 | Pienaar . |
| 5,775,858 | 7/1998 | Bacon . |
| 5,797,712 | 8/1998 | Gearin et al. . |
| 5,924,248 | * 7/1999 | Cox et al. . |
| 6,010,285 | * 1/2000 | Cox et al. . |

FOREIGN PATENT DOCUMENTS 119570    10/1930   (DE) .

* cited by examiner

*Primary Examiner*—D. Glenn Dayoan
*Assistant Examiner*—Scott Carpenter
(74) *Attorney, Agent, or Firm*—Troutman Sanders; Gerald R. Boss (57) ABSTRACT

A multiple transport system for transporting automobiles within a container includes a first and second automobile carrier. The first automobile carrier includes a base having a first and second leg extending from the base offset from one another to define an automobile carrier receiving space. An inclined platform extends upward from the base and carries a first automobile in an inclined position. A second automobile carrier for carrying a second automobile includes a front portion having a width less than the offset of the first and second legs of the first automobile carrier enabling the second automobile carrier to be received between the offset legs of the first automobile carrier in an overlapping transport position.

9 Claims, 5 Drawing Sheets

MULTIPLE AUTOMOBILE TRANSPORT SYSTEM

BACKGROUND OF INVENTION

This invention relates generally to a transportation system for transporting automobiles and more particularly to a multiple automobile transport system for transporting a plurality of automobiles within a standard shipping container.

The marketing of automobiles involves transporting the automobiles from a variety of locations. The automobiles require transporting from a manufacturing facility to a distribution center and finally to the dealer for sale to the public. During the transport of the automobiles, it is important that the automobiles are not damaged which would require repairs and increase the overall cost of the automobiles. In addition to ensuring the safe transport of the automobiles, it is also important that as many automobiles as possible be transported at the same time to reduce the overall transportation costs.

One method of transporting a large number of automobiles at the same time consists of utilizing an overland hauler which is towed by a tractor over highways. While such carrier's are useful for their intended purpose, they expose the automobile to the environment and during transport, the automobiles may be damaged by road grit or rocks flying up from the road. Furthermore, such haulers are not suitable for transporting in ships since they are large and bulky and do not protect the automobiles from the environment.

Another method of transporting automobiles consists of storing the automobiles within shipping containers. This transport system encloses the automobiles and protects them from the outside environment. Currently, there are many ways in which automobiles are shipped within containers.

A first method of loading automobiles within the container consists of individuals driving the automobiles within the container's interior. This method of loading is known as "internal" loading. A problem with internal loading is that little clearance exists between the automobiles and the sides of the container and there is a risk that the automobile doors may be dinged when the drivers exit the automobiles. Also, there is always a risk that human error may result in the automobile being damaged while being driven within the narrow confines of the container. Furthermore, when cars are driven into the interior of the containers, they generally are only loaded upon the container floor and typically, a container only has sufficient length to contain two automobiles on its floor bed.

However, if the container has sufficient height, inclined vehicle carriers may be utilized for transporting the automobiles. Such an inclined vehicle carrier system is illustrated in co-pending U.S. patent application 08/943,539. The inclined ramps of the inclined vehicle carrier system enable two additional automobiles to be transported within the vertical space of the container's interior above the floor bed. Typically, automobiles are driven onto the inclined vehicle carriers prior to the inclined vehicle carriers being loaded within the interior of the container. Once the automobiles are loaded onto the inclined vehicle carriers, the inclined vehicle carriers are handled by fork lifts and deposited within the interior of the container. This technique is referred to as "external loading".

However, in some situations, limitations arise which prevent the utilization of a single vehicle carrier for transporting two automobiles. These limitations may either arise from the size of the shipping container or the size of the automobiles being transported. For instance, some shipping containers have height limitations which limit the incline of an upper automobile support preventing a single vehicle carrier from being used for transporting multiple automobiles. Additionally, some automobiles such as sports utility vehicles or other large automobiles are very large, bulky and heavy. Consequently, positioning two similar sized vehicles of this type onto a single vehicle carrier results in a vehicle carrier which cannot be handled by forklifts due to the extreme weight. Additionally, due to the size of these vehicles in combination with the height limitations of a shipping container, if one automobile were to be positioned directly beneath an inclined one, the angle required would be too steep to be feasible.

Thus, there is a need for a new system which will enable more than two automobiles to be transported within a standard container in a manner which is not unduly cumbersome. Furthermore, such a system should be designed to facilitate in the easy handling of the respective automobiles during the loading and unloading from a shipping container.

Accordingly, it is an object of the present invention to provide a transportation system which will enable more than two automobiles to be transported simultaneously within the interior of a container;

Also, it is an object of the present invention to provide a horizontal pallet design which may be utilized with an inclined automobile support to enable more than two automobiles to be transported simultaneously within the interior of a shipping container;

Furthermore, it is an object of the present invention to provide a locking mechanism providing for the connectability of pallets enabling the removal of automobiles within the interior of a shipping container to be achieved in an orderly manner;

Additionally, it is an object of the present invention to provide a unique pallet design for transporting large vehicles.

SUMMARY OF THE INVENTION

The above objectives are accomplished according to the invention by providing a multiple automobile transport system for transporting automobiles within a container. The transport system includes a first and second automobile carrier which include overlapping portions. The first automobile carrier includes a base for being carried by the floor bed of a shipping container. An inclined platform extends upward from the base for carrying a first automobile in an inclined position. The second automobile carrier includes a base for being carried by the floor bed of the shipping container. The base defines a platform for carrying a second automobile. The first and second automobile carriers are constructed to longitudinally overlap thereby enabling two automobiles to be positioned within a footprint smaller than two horizontal automobiles by supporting an inclined automobile at an angle and length which is acceptable within the container's interior.

DESCRIPTION OF THE DRAWINGS

The construction designed to carry out the invention will hereinafter be described together with other features thereof. The invention will be more readily understood from a reading of the following specification and by reference to the accompanying drawings forming a part thereof, wherein an example of the invention is shown and wherein.

DESCRIPTION OF THE PREFERRED EMBODIMENT

Figure 1:
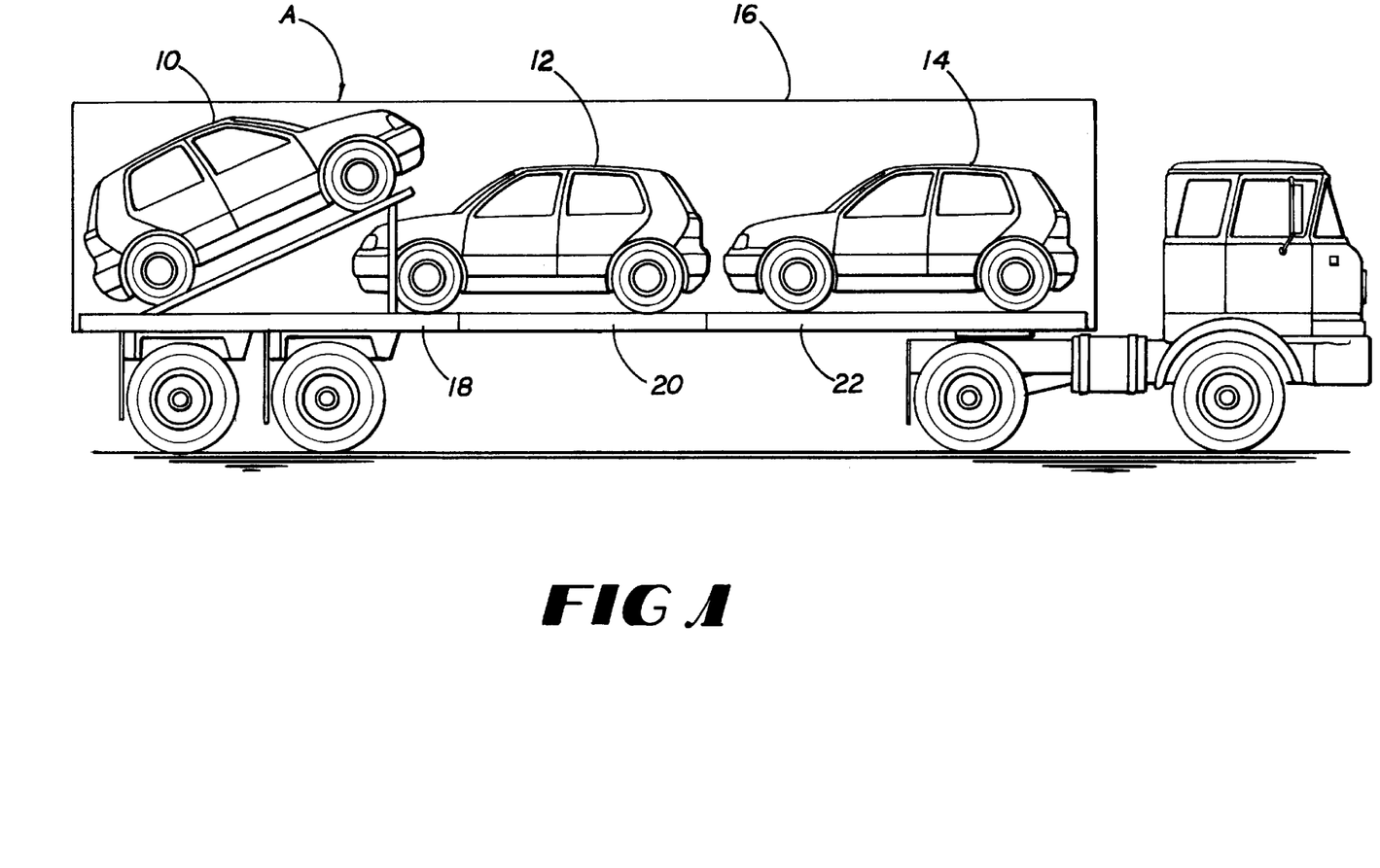
FIG. 1 illustrates three automobiles being transported within a standard container according to the present invention.

Referring now in more detail to the drawings, as shown in FIG. 1, multiple automobile transport system A is utilized for transporting at least three automobiles, first automobile 10, second automobile 12 and third automobile 14 within a standard container 16. First automobile 10 is carried in an inclined position by first automobile carrier 18. Second automobile 12 is carried by second automobile carrier 20 partially underneath first automobile 10. Third automobile 14 is carried by third automobile carrier 22 behind second automobile carrier 20.

Figure 2:
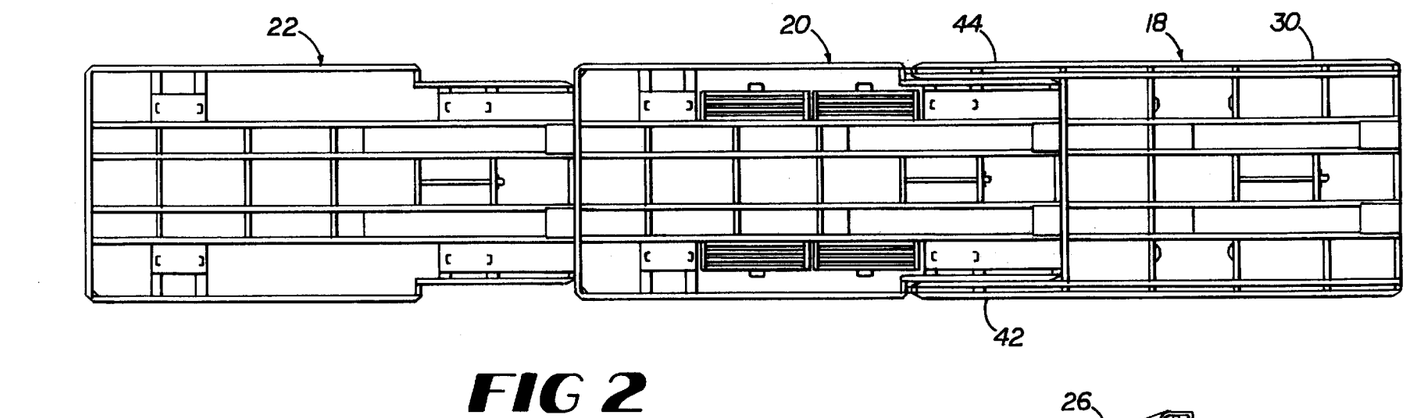
FIG. 2 illustrates a top plan view of the bases of individual automobile carriers for use in a multiple automobile transport system according to the present invention.

As shown in FIG. 2, the three automobile carriers have generally the same width for fitting within the interior of a standard container. Preferably this width is two thousand and three hundred millimeters. The vehicle carriers are positioned along a common longitudinal axis along the floor bed of container 16. In this arrangement, three automobiles may be stored within the interior of container 16. The first and second automobile carriers 18 and 20 overlap one another in a longitudinal direction enabling two automobiles to be positioned within a longitudinal footprint which is smaller than two automobiles positioned horizontally on the base of the container.

Figure 3:
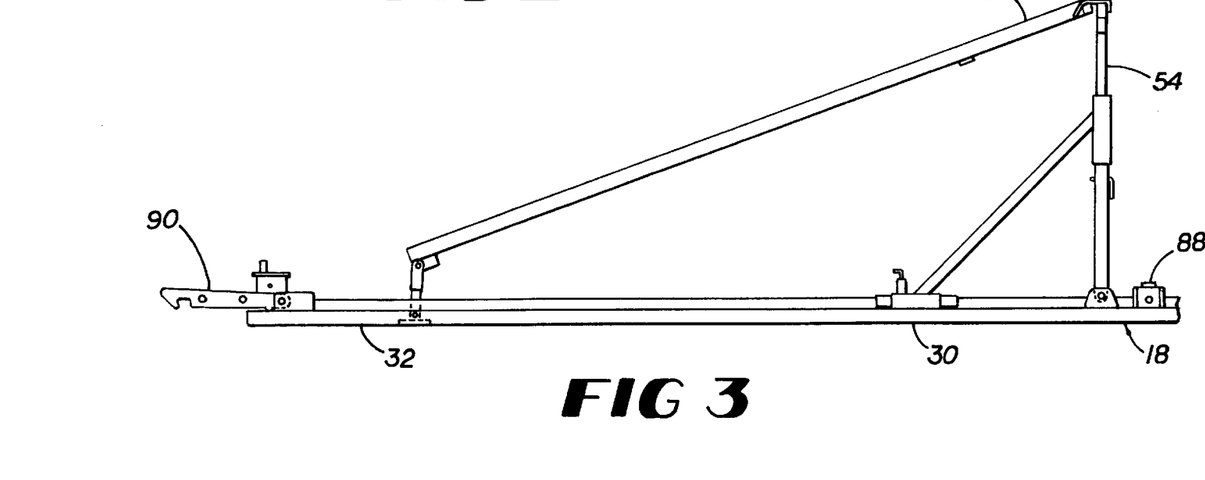
FIG. 3 illustrates a side view of an inclined automobile carrier for use in a multiple automobile transport system according to the present invention.
Figure 4:
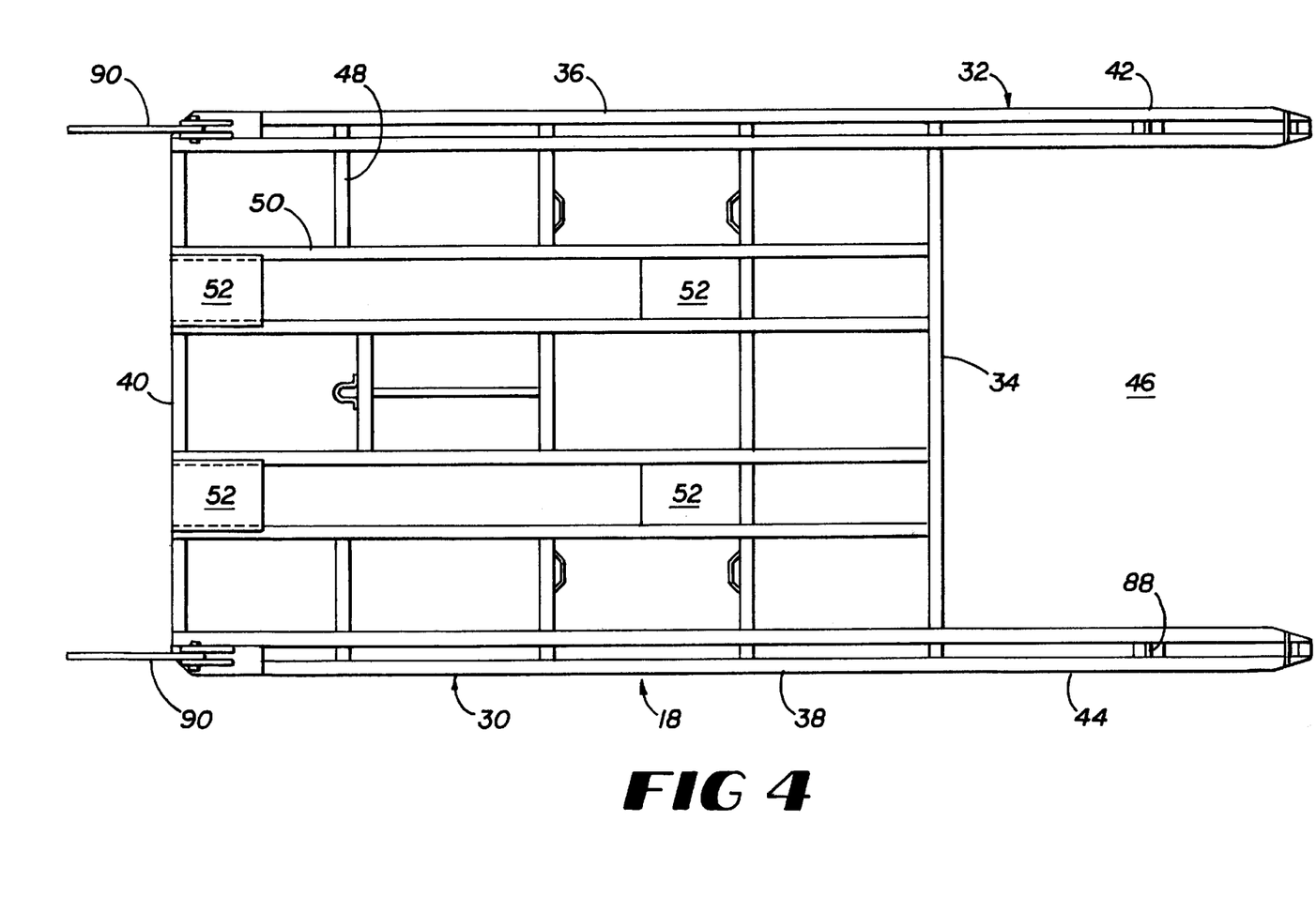
FIG. 4 illustrates a top view of the base pallet of the inclined automobile carrier for use in the multiple automobile transport system according to the present invention.

As shown in FIGS. 2, 3 and 4, first automobile carrier 18 includes first automobile carrier base 24 which rests upon the floor bed of container 16 and inclined ramps 26. First automobile carrier base 24 includes a back frame portion 30 and a front frame portion 32. Back frame portion 30 includes front frame member 34, left frame member 36, right frame member 38 and rear frame member 40. Back frame portion 30 also consists of a plurality of internal lateral frame members 48 which are offset from one another and a plurality of internal longitudinal frame members 50 which are also offset from one another and which in combination with the other frame members define a lightweight pallet. Fork receptacles 52 are carried by back frame portion 30 for receiving the arms of a material handling device such as a forklift enabling first automobile carrier 18 to be positioned within container 16.

Front frame portion 32 of first automobile carrier 16 includes a first leg 42 which extends from left frame member 36 forward and away from front frame member 34 and a second leg 44 which extends from right frame member 38 forward and away from front frame member 34. First leg 42 and second leg 44 are offset to define second automobile carrier receiving space 46. The offset of first and second legs 42 and 44 is generally the width of front frame member 32 and the width of the front portion of second automobile carrier 20 as will be described in more detail. In the preferred embodiment this offset is approximately two thousand millimeters and both legs are approximately one thousand four hundred and thirty millimeters in length. The overall length of first automobile carrier 16 is approximately four thousand four hundred and fifty millimeters.

Figure 6:
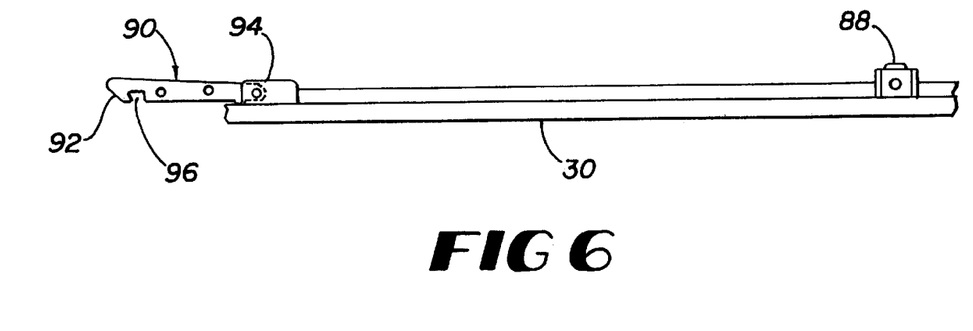
FIG. 6 illustrates a side view of the latching mechanism utilized for integrating the respective automobile carriers for use in the multiple automobile transport system according to the present invention.

As shown in FIGS. 1 and 6, first automobile 10 is carried by first automobile carrier 18 in an inclined position above first automobile carrier base 24 by inclined ramps 26. Both inclined ramps 26 include a first end which carry unshaped brackets for attachment to lateral frame members 48. To support inclined ramps 26 in an inclined position, first inclined ramp support 54 is carried by first leg 42 and second inclined ramp support 56 is carried by second leg 44. Both first and second inclined ramp supports 54 and 56 extend upward from their respective legs. Horizontal support bar 58 is carried by first and second inclined ramp supports. Both inclined ramps 26 include a second end which carries u-shaped brackets for attachment to horizontal support bar 58. In the preferred embodiment, inclined ramps 26 are elevated to a height approximately four feet above first and second legs 42 and 44 to provide sufficient clearance for the hood of a second automobile to be positioned within second automobile carrier receiving space 46.

Figure 5:
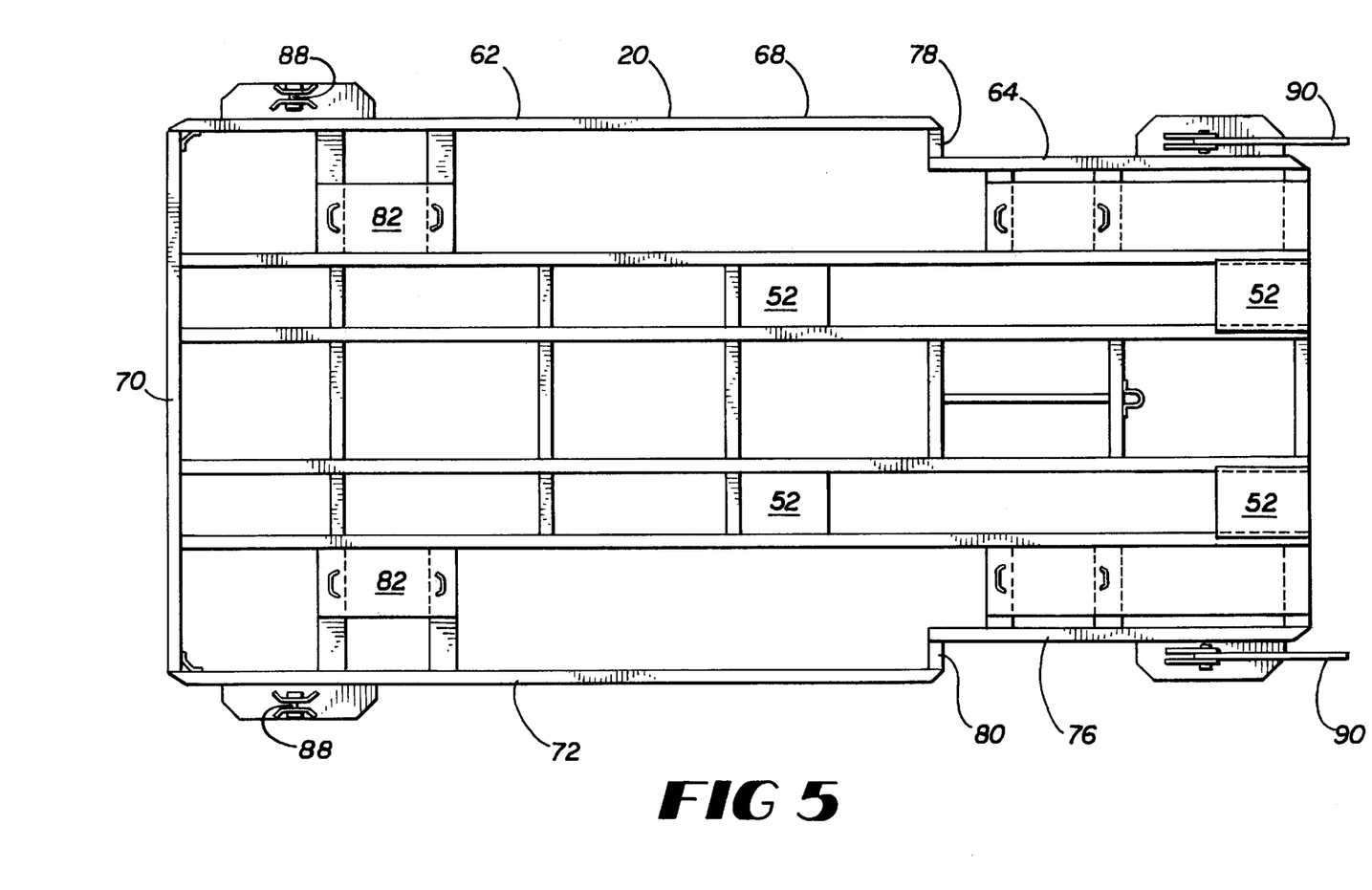
FIG. 5 illustrates a top view of the base pallet of a horizontal automobile carrier for use in the multiple automobile transport system according to the present invention.

As shown in FIGS. 2 and 5, second automobile carrier 20 and third automobile carrier 22 are the same. By having third automobile carrier 22 identical to second automobile carrier 20 flexibility is provided in the arrangement of the respective automobile carriers within the interior of the container 16. Both of these vehicle carriers include vehicle carrier base 60. Vehicle carrier base 60 includes back frame member 62 and front frame member 64. Back frame member 62 is wider than front frame member 66. In the preferred embodiment, back frame member 62 is approximately two thousand three hundred millimeters in width and front frame member 66 is one thousand nine hundred seventy millimeters in width. As previously mentioned, a second automobile carrier receiving space 46 is of sufficient size for receiving front frame member 66 of second automobile carrier 20. In the preferred embodiment, back frame member 62 consists of a left side member 68, rear side member 70 and right side member 72. Front frame member 66 includes a front left frame member 74 and a front right frame member 76. The front left frame member 74 is offset from left side member 68 of back frame member 62 by approximately one hundred and fifteen millimeters. Likewise, the front right frame member 76 is offset from right side member 72 of back frame member 62 by approximately one hundred and fifteen millimeters. Offset frame members 78 and 80 connect the front left frame member 74 and front right frame member 76 respectively with back frame member 62. Of course, the width of the back frame portion and the front frame portion may be the same as long as the front frame portion may be received within the offset of the first automobile carrier. The second automobile carrier 20 also includes a plurality of wheel wells 82 receiving the wheels of an automobile. Tie downs 84 are used to secure the wheels to the vehicle carrier base. Also, fork receptacles 52 are carried by vehicle carrier bas 60 for receiving the forks of a forklift.

As can be seen in FIGS. 1 and 2, the overlapping transport position of the second automobile carrier 20 or third automobile carrier 22 with respect to first automobile carrier 18 enables the three automobile carriers to be placed simultaneously within the interior of a standard container. In the preferred embodiment, the overlapping area is approximately one thousand four hundred and thirty millimeters. The overlap enables the incline ramps 26 to be gradually inclined such that the overall grade of the incline is sufficient to position the incline over the front of the second automobile 12 while also being of a height less than the height of a standard container which is approximately eight and one-half feet high.

In operation, three automobiles are packaged for transport within standard container 16. The first automobile 10 is externally loaded outside of the standard container's interior by driving the automobile onto intermediate ramps, not shown, onto inclined ramps 26. In the preferred embodiment, inclined ramps 26 include a knuckle portion 86 for securing the front wheels of the automobile onto the inclined ramps. Also, second and third automobiles are externally loaded onto the respective automobile carriers by driving the automobiles over the low profile of the pallet and onto the wheel wells where they are secured to the tie downs. Once the three automobiles are loaded respectively externally onto the vehicle carriers, a forklift places its forks within the respective fork receptacles for lifting the respective pallets upward and positioning the respective pallet within the standard container's interior. Typically, either the second or third automobile carrier will be loaded first with the other similar automobile carrier loaded second. In this manner, the second loaded automobile carrier is lifted by the forklift to abut the first loaded vehicle carrier and is pushed backwards thereby pushing both the first and second loaded vehicle carriers into the container. The first automobile carrier is then loaded with the legs of the automobile carrier positioned such that the front frame portion of either the second or third automobile carrier is positioned to be received between the front legs of the first automobile carrier.

The first automobile carrier is then pushed into the interior of the automobile carrier until the entire automobile carrier is loaded within the interior. By having the automobiles externally loaded, the risk of damage to the automobiles is reduced. Furthermore, by having the second and third automobile carriers identical, these vehicle carriers may be interchangeable thereby facilitating in the ease of handling the respective automobiles. The positioning of the second or third automobile carrier within the interior in a special order is not required since the automobile carriers each have a front frame member which can be received within the offset of the first automobile carrier. Additionally by providing pallets, the cars may be easily loaded externally and positioned within the interior of the container.

FIG. 6 shows a second embodiment of the invention for shipping large and heavy automobiles such as sport utility vechicles. Since sport utility vechicles are heavy and larger than other automobiles, it is advantageous to transport only one vehicle per vehicle carrier to enable handling by forklift. A typical sport utility vehicle has an external length of over fifteen feet and a height of over five and half feet. For transporting a sport utility on first automobile carrier 10, inclined ramps 26 are preferably at twenty-one degrees relative to the base. This incline enables the sport utility vehicle to be positioned above the base in a manner which accomodates both the height and length of the sport utility. In this preferred embodiment, the height of the inclined ramps 26 is approximately five feet above the base. This height enables the front portion of a sport utility vehicle upon the second automobile carrier 12 to be positioned beneath the ramps. Front frame portion 34 of back from portion 20 of first automobile carrier 10 is positioned traversely between first and second legs 42 and 44 approximately four and a half feet from the end of first and second legs 42 and 44. Front frame member 34 provides a stop for abutting the front edge of second automobile carrier 12. When second automobile carrier 12 is positioned within the second automobile carrier receiving space 46, the front edge of second automobile carrier 12 is pushed forward until it abuts front frame member 34. This abutting interface enables the lower automobile to be positioned beneath the inclined upper automobile in a manner which prevents the lower automobile from engaging the inclined ramps and damaging the automobile, The abutting interface enables the lower automobile to be manipulated from behind utilizing a forklift or other lifting means without fear of damaging the automobile. Once the second automobile carrier is positioned within the second automobile carrier receiving space of the first automobile carrier, the operator merely slides the second automobile carrier forward until it abuts the front frame portion.

As shown in FIGS. 3,4 5, and 6, locking interface 86 locks first and second automobile carriers 10 and 12 together. Locking interface 86 preferably includes a horizontal bar 88, which is preferably square, which traverses across first leg 42 of first automobile carrier 10 and a latch 90 which is carried by second automobile carrier 12. Latch 90 includes tapered end 92 and a back end which is pivotally carried by latch housing 94. Latch 90 includes latch opening 96 which is perferably square for receiving horizontal bar 88. The positioning of horizontal bar 88 and latch opening 96 are positioned with respect to one another such that opening 96 is positioned in an interlocking relationship with horizontal bar 88 when the front of second automobile carrier abuts stop 34. The tapered front of latch 90 enables the front portion to ride over horizontal bar 88 as the automobile carriers are being position in a overlapping arrangement enabling the latch opening to be positioned above the horizontal bar when the vehicle carriers abut enabling the vehicle carriers to become interlocked due to gravity lowering latch 90 into engagement with the horizontal bar.

In operation, when loading the respective carriers into a closed container, as second automobile carrier 12 is being positioned in the overlapping relationship with first automobile carrier 10, the front portion of the second carrier will abut stop 34 and latch opening 96 will simultaneously engage horizontal bar 88 for locking second automobile carrier with first automobile carrier 10. Of course, the location of horizontal bar 88 and latch 90 may be positioned in any manner with respect to the respective vehicle carriers as long as the locking mechanism secures the first and second vehicle carriers when in the overlapping transport position.

Additionally, second vehicle carrier also includes horizontal bar 88 for locking engagement with latch 90 carried by third vehicle carrier. When the second embodiment is present, latch 90 is carried by a second first vehicle carrier assembly. Since the third vehicle carrier or a second first vehicle carrier assembly do not overlap the second vehicle carrier, the interlocking mechanism is designed to function when the front portions of either the third vehicle carrier or a second first vehicle carrier assembly abut the back of the second vehicle carrier. In this manner, a plurality of transport configurations may be had.

For example, three automobile may be transported with the first and second automobile carriers in an overlapping arrangement and a third automobile carrier abutting the back portion of the second automobile carrier. Each of these automobile carriers would be interlocked via respective locking mechanisms. Additionally, in a second example, for transporting sport utility vehicles in conjunction with a larger container, two separate assemblies of first and second overlapping vehicle carriers may be positioned within the container's interior enabling four automobiles to be transported. Each of these vehicle carriers would also be interlocked via respective locking mechanisms.

In operation, when loading the respective vehicle carrier into a small container which will only allow for the transportation of three vehicle carriers, the first vehicle carriers is manipulated preferably by a forklift and positioned within a container. The vehicle carrier is pushed into the container's interior. The second vehicle carrier is subsequently positioned within the container and pushed into overlapping engagement with the first vehicle carrier. Upon reaching the overlapping engagement with the first vehicle carrier, the locking mechanism secures the first and second vehicle carriers together. Next, a third vehicle carrier is positioned within the container and is positioned forward to abut the second vehicle carrier. Upon abutting the second vehicle carrier, the locking mechanism secures the second and third vehicle carriers together.

Figure 7:
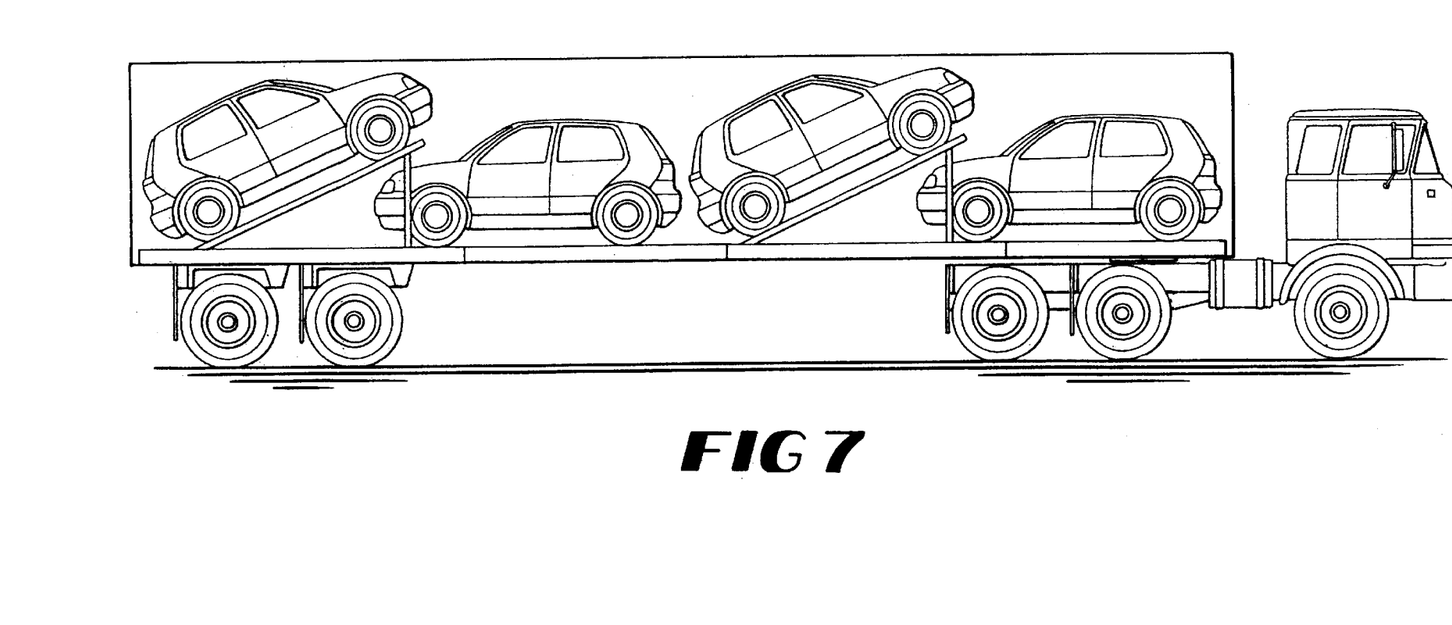
FIG. 7 illustrates a second embodiment of the present invention enabling four large automobiles to be transported within a container having sufficient longitudinal length.

As shown in FIG. 7, if four automobiles are to be transported, two sets of first and second vehicle carrier assemblies are utilized. A first set of first and second vehicle carriers will be locked in an overlapping position and a second set of first and second vehicle carriers will be locked in an overlapping position. Additionally, the first set will be interlocked with the second set via the locking mechanisms between the second vehicle carrier of the first assembly and the first vehicle carrier of the second assembly.

In unloading the vehicle carriers, the vehicle carrier closest to the container's door will be moved rearwardly utilizing a forklift. Since all of the vehicle carriers are interlocked, they will move simultaneously. The vehicle carrier manipulated by the forklift will be lifted upwards disengaging that vehicle carrier's latch with the horizontal bar of the adjacent vehicle carrier and enabling the vehicle carrier to be removed from the container's interior. The additional vehicle carriers will be removed in like manner.

Thus it may be seen, that a more advantageous method of transporting automobiles within a standard shipping container may be had. By providing individual vehicle carriers for the automobiles, the automobiles may be loaded externally and handled by forklifts. By providing a unique design, the vehicle carriers may be overlapped such that a first automobile may be inclined over the hood of a second automobile. This maximizes the utilization of the horizontal floor space of the standard container enabling three automobiles to be positioned within the shipping container.

What is claimed is:

1. A multiple automobile transport system for transporting automobiles within a container comprising:
   a first automobile carrier comprising:
      a first automobile carrier base for being carried by the floor bed of said container;
      a first and second leg extending from said base offset from one another to define an automobile carrier receiving space; and
      an inclined platform extending upward from said base from carrying a first automobile in an inclined position; and
   at least a first pair of fork receptacles for receiving forks of a forklift for manipulating the position of said first automobile carrier within a container; and
   a second automobile carrier comprising:
      a second automobile carrier base for being carried by the floor bed of said container, said second automobile carrier base defining a platform for carrying a second automobile;
      said second automobile carrier base including a front portion and a back portion;
      said front portion of said base having a width less than said offset of said first and second legs of said first automobile carrier enabling said front portion of said second automobile carrier base to be received within said automobile carrier receiving space of said first automobile carrier defining a transport position wherein said front portion of said second automobile carrier base overlaps the profile defined by said first automobile carrier;
      said back portion of said second automobile carrier base extending beyond the overlapping region of the front portion of said second automobile carrier base and said first automobile carrier when said second automobile carrier base is in said transport position; and
   at least a second pair of fork receptacles for receiving forks of a forklift for manipulating the position of said second automobile carrier within a container;
   wherein said first and second automobile carriers may independently be positioned within a container by a forklift with said first automobile carrier and said second automobile carrier being positioned in said overlapping transport position.

2. The multiple automobile transport system of claim 1 including a third automobile carrier being carried by said floor bed of said container, said third automobile carrier being of the same configuration as said second automobile carrier defining a platform for carrying a third automobile, whereby a system for transporting three automobiles in a standard container is provided wherein a first automobile is elevated in an inclined position and carried by a first automobile carrier having offset legs and either said second of third automobile carrier maybe positionally interchanged between the offset legs in said transport position.

3. The multiple transport system of claim 1 wherein both said first and second automobile carriers have a predetermined length and wherein the summation of the combined lengths of said first and second automobile carriers is less when combined in said transport position than when not combined in said transport position such that a smaller are of said container floor bed is covered when said first and second automobile carriers are combined in said transport position than when not combined in said transport position.

4. The multiple transport system of claim 1 wherein said first automobile carrier includes a first locking means and said second automobile carrier includes a second locking means which engages said first locking means when said second automobile carrier is received within said automobile receiving space.

5. A multiple automobile transport system for transporting automobiles within a container comprising:
   a first automobile carrier comprising:
      a first automobile carrier base for being carried by the floor bed of said container;
      a first and second leg extending from said base offset from one another to define an automobile carrier receiving space;
      a transverse member interconnecting said first and second leg extensions defining a front boundary of said automobile carrier receiving space; and an inclined platform extending upward from said base for carrying a first automobile in an inclined position; and a second automobile carrier comprising:

a second automobile carrier base for being carried by the floor bed of said container, said second automobile carrier base defining a platform for carrying a second automobile having a general profile;

said second automobile carrier base including a front portion and a back portion;

said front portion of said base having a width less than said offset of said first and second legs of said first automobile carrier enabling said front portion of said second automobile carrier base to be received within said automobile carrier receiving space of said first automobile carrier defining a transport position;

at least a pair of wheel supports carried by said second automobile carrier base for carrying the front wheels of a second automobile, said pair of wheel supports being offset from said front portion a predetermined distance; and said wheel supports offset being of sufficient length such that said general profile of said second automobile will not contact said inclined platform of said first vehicle carrier when said second automobile carrier is received within said automobile carrier receiving space.

6. A transportation system for transporting four automobiles within a container comprising:

a first automobile carrier including a base and an inclined portion for carrying a first automobile in an inclined position above the floor of the container;

a second automobile carrier including a base for carrying a second automobile in a generally horizontal position beneath the first automobile;

said first and second automobile carriers including overlapping portions in a longitudinal direction enabling the two automobiles to be positioned within a longitudinal footprint of the floor of said container which is less than the longitudinal footprint required by two automobiles positioned longitudinally on the floor of said container;

said first and said second automobile carriers include matingly engaging locking means for securing said first and second automobile carriers together when said second automobile vehicle carrier is received within an automobile carrier receiving space;

a third automobile carrier including a base and an inclined portion for carrying a third automobile in an inclined position above the floor of the container;

a fourth automobile carrier including a base for carrying a fourth automobile in a generally horizontal position beneath the third automobile;

said third and fourth automobile carriers including overlapping portions in a longitudinal direction enabling the two automobile to be positioned within a longitudinal footprint of the floor of said container which is less than the longitudinal footprint required by two automobiles positioned longitudinally on the floor of said container;

wherein four automobile may be transported within a single container upon individual automobile carriers facilitating in the material handling of each respective automobile.

7. The transportation system of claim 6 wherein said second and third automobile vehicle carriers include matingly engaging locking means for securing said second and third automobile vehicle carriers together when said third vehicle carrier abuts said second automobile vehicle carrier.

8. The transportation system of claim 7 wherein said locking means includes a horizontal bar and a latch having a cross-section representative of said horizontal bar.

9. The transportation system of claim 8 wherein said third and fourth automobile vehicle carriers include matingly engaging locking means for securing said third and fourth automobile vehicle carriers together when said fourth automobile vehicle carrier is received within an automobile carrier receiving space of said third automobile vehicle carrier.

* * * * *